(12) United States Patent
MacLaren et al.

(10) Patent No.: US 10,956,342 B1
(45) Date of Patent: Mar. 23, 2021

(54) VARIABLE CHANNEL MULTI-CONTROLLER MEMORY SYSTEM

(71) Applicant: CADENCE DESIGN SYSTEMS, INC., San Jose, CA (US)

(72) Inventors: John MacLaren, Austin, TX (US); Jerome J. Johnson, Cedar Park, TX (US); Landon Laws, Austin, TX (US); Anne Hughes, Austin, TX (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 242 days.

(21) Appl. No.: 15/424,054

(22) Filed: Feb. 3, 2017

(51) Int. Cl.
*G06F 12/14* (2006.01)

(52) U.S. Cl.
CPC .. *G06F 12/1425* (2013.01); *G06F 2212/1052* (2013.01)

(58) Field of Classification Search
CPC .............. G06F 12/1425; G06F 2212/1052
See application file for complete search history.

(56) References Cited

U.S. PATENT DOCUMENTS

| | | | | |
|---|---|---|---|---|
| 6,279,078 B1* | 8/2001 | Sicola | ................. | G06F 11/1666 711/119 |
| 9,767,921 B1* | 9/2017 | Pan | ....................... | G11C 29/028 |
| 2003/0200398 A1* | 10/2003 | Harris | .................... | G06F 3/0601 711/152 |
| 2009/0055572 A1* | 2/2009 | Askar | ................. | G06F 13/1684 711/100 |

* cited by examiner

*Primary Examiner* — Adam M Queler
*Assistant Examiner* — Eric T Loonan
(74) *Attorney, Agent, or Firm* — Tarolli, Sundheim, Covell & Tummino LLP

(57) ABSTRACT

A multi-controller memory system includes a flexible channel memory controller coupled to at least first and second physical interfaces. The second physical interface is also coupled to an auxiliary memory controller. The physical interfaces may be coupled to separate memory modules. In a single-channel control mode, the memory controllers respectively control the memory modules coupled to the first and second physical interface. In a multi-channel control mode, the flexible channel memory controller controls both memory modules while the auxiliary memory controller is inactive. In a single-channel control mode, the memory controllers coordinate restricted memory control commands which access a resource shared by both modules, by one controller transmitting a request signal for the resource to the other controller, awaiting an acknowledgment signal from the other controller, and maintaining transmission of the request signal until the use of the resource is completed.

19 Claims, 9 Drawing Sheets

VARIABLE CHANNEL MULTI-CONTROLLER MEMORY SYSTEM

BACKGROUND OF THE INVENTION

The subject system and method are generally directed to a memory controller system, and more specifically to a variable channel multi-controller memory system operating in a plurality of control modes.

Memory controllers are well known in the art. They are implemented as digital circuits dedicated to controlling/managing the flow of data written to and read from one or more memory devices, and to preserve the same by periodically refreshing the memory as needed. They may be suitably formed as separate devices or integrated with a central processing unit or other main controller, and serve the memory storage and access needs of various control or user application "master" operations processed thereby. Memory controllers implement the logic necessary to read from and write to various types of memory devices, examples of which include dynamic random access memory (DRAM), as well as electrically programmable types of non-volatile memory such as flash memory, and the like.

When a memory controller system is manufactured without any memory device, and a separately-manufactured device or devices are added to the system later, it is desirable for the memory controller system to be flexible in the types of devices it may accept. However, different types of memory devices may have different physical requirements for the corresponding controller system in terms of interface, signal voltage, signal format, and other qualities. The simplest solution is to provide a different controller and different interface for each type of memory device, but the resulting system is more bulky and more costly to manufacture.

Also, a memory device may include multiple memory modules. It may be desirable to interact with these memory modules in an independent manner, as if they were separate memory devices. However, certain resources in the memory device may be shared by all modules in the device, and therefore completely independent control of the modules is impossible.

There is therefore a need for a memory controller system that may control more types of memory devices without a proportional increase in the number of memory controllers and interfaces.

There is also a need for a memory controller system that may control memory modules within a memory device as independently as possible.

SUMMARY OF THE INVENTION

It is an object of the disclosed system and method to establish a plurality of memory controllers and physical interfaces which may flexibly control memory modules of any of a plurality of memory protocols in a more efficient manner.

It is another object of the disclosed system and method to establish a plurality of memory controllers each controlling different memory modules and coordinating use of resources shared by both, with designation of a "master" controller only in limited circumstances.

These and other objects may be attained in a variable multi-controller memory system and method of operating said system. While not limited thereto, an exemplary embodiment is directed to a variable channel multi-controller memory system. The system includes a flexible channel memory controller, an auxiliary memory controller coupled to the flexible channel memory controller, a first physical interface for coupling to a first memory module, the first physical interface coupled to the flexible channel memory controller, and a second physical interface for coupling to a second memory module, the second physical interface coupled to both the flexible channel and auxiliary memory controllers. The flexible channel and auxiliary memory controllers are variably actuated according to a plurality of control modes for controlling the first and second memory modules. In a single-channel control mode, the flexible channel and auxiliary memory controllers are configured for respective independent control of the first and second memory modules through the first and second physical interfaces. In a multi-channel control mode, the flexible channel memory controller is configured for combined control of both the first and second memory modules through the first and second physical interfaces respectively.

While not limited thereto, another exemplary embodiment is directed to a method of variably controlling a memory device using a plurality of memory controllers. The method includes establishing a flexible channel memory controller and an auxiliary memory controller coupled to each other, establishing a first physical interface coupled to the flexible channel memory controller, establishing a second physical interface coupled to the auxiliary memory controller, respectively coupling the first and second physical interfaces to a first and second memory module of the memory device, selecting a control mode from a plurality of control modes, and variably actuating the flexible channel and auxiliary memory controllers to operate in the selected control mode. At least a first control mode is a single-channel control mode wherein the flexible channel and auxiliary memory controllers are configured for respective independent control of the first and second memory modules through the first and second physical interfaces. At least a second operation mode is a multi-channel control mode wherein the flexible channel memory controller is configured for combined control of both the first and second memory modules through the first and second physical interfaces respectively.

While not limited thereto, still another exemplary embodiment is directed to a cooperative multi-controller memory system. The system includes a first memory controller, a second memory controller coupled to the first memory controller, a first physical interface for coupling to a first memory module, the first physical interface coupled to the first memory controller, and a second physical interface for coupling to a second memory module, the second physical interface coupled to at least the second memory controller. The first memory controller executes to withhold a pending restricted memory control command responsive to a restricted command lockdown signal from the second memory controller.

Additional aspects, details, and advantages of the disclosed system and method will be set forth, in part, in the description and figures which follow.

DETAILED DESCRIPTION OF THE PREFERRED EMBODIMENTS

Figure 1:
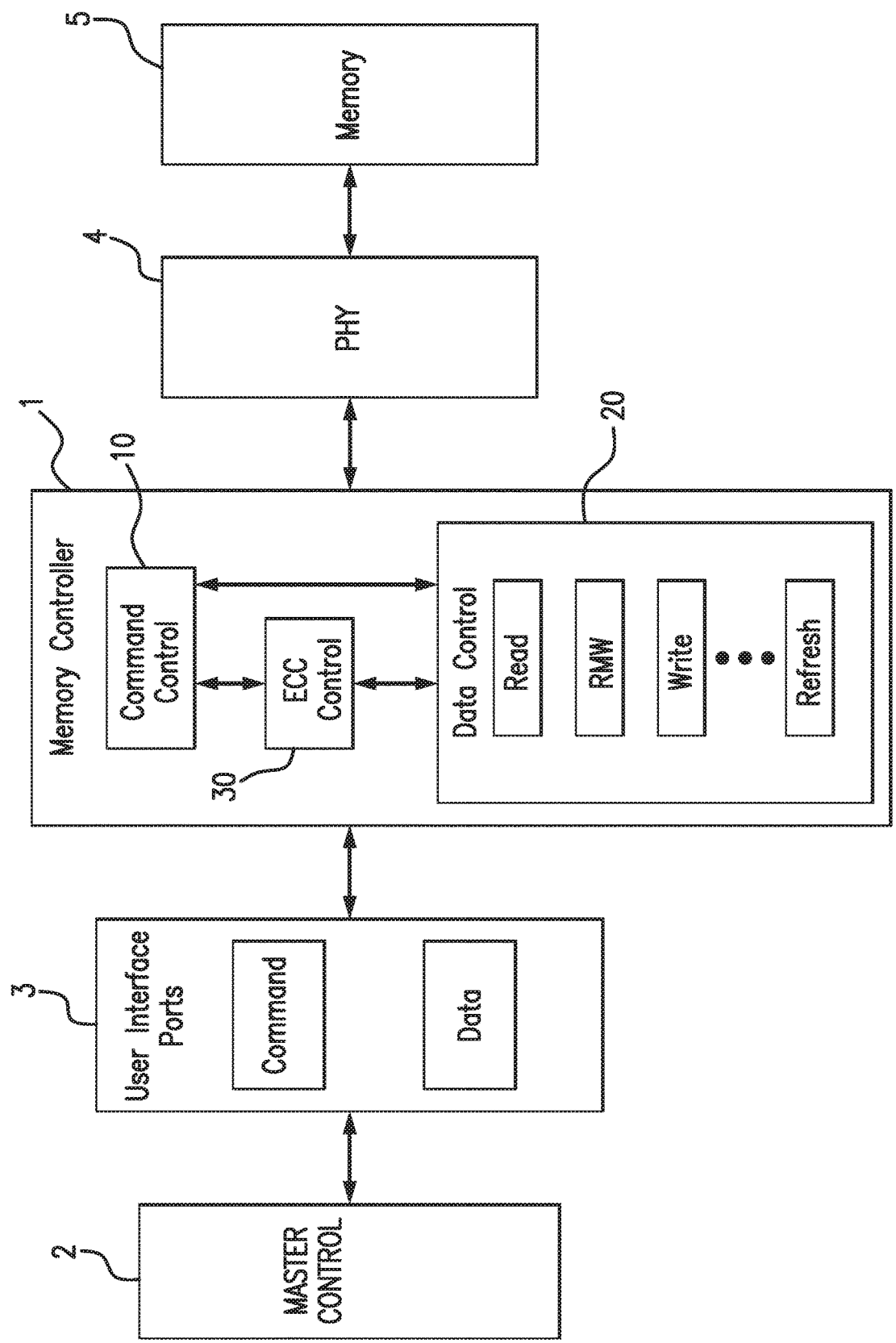
FIG. 1 is a schematic diagram generally illustrating portions of a memory controller system operably intercoupled in one exemplary implementation to provide control of a coupled memory.

Reference will now be made in detail to exemplary embodiments, which are illustrated in the accompanying drawings, wherein like reference numerals refer to the like elements throughout. The embodiments are described below in order to explain the disclosed system and method by referring to the figures.

As used herein, the term "memory protocol" or "protocol" describes the collective requirements for communication with a particular memory device, aspects of which may include but are not limited to the physical configuration of the required physical interface, the required voltage for signals to and from the memory device, the required signal timing characteristics, and the required format of command and/or addressing signals. Protocols are also sometimes termed "memory specifications" in the art. Examples of protocols include but are not limited to SRAM, SDRAM (including DDR, DDR2, DDR3, and DDR4), RLDRAM, and EDO DRAM.

A conventional memory controller, with corresponding physical interface or interfaces, has limited flexibility in the types and configurations of memory devices it may process; that is, it is capable of handling a limited number of protocols, usually one. Therefore, according to certain aspects of the invention, multiple memory controllers cooperate to control a wider variety of memory devices and/or memory device protocols. The memory controllers may be each coupled to a respective memory module in the memory device, through a physical interface, for respective control. One or more of the memory controllers may also be coupled to more than one memory module, and may be selectively reprogrammable or actuable such that different memory controllers may be in control of particular modules depending on an active operation mode or control mode, allowing a memory controller configured for the appropriate protocol to control the appropriate modules. Using these principles and others described further herein, the different memory controllers may be more easily reconfigured to cooperatively control the memory modules of memory devices having different protocols, and may control a larger variety of memory devices without requiring a separate controller and interface for each.

Referring now to FIG. 1, there is shown a general schematic diagram illustrating a memory controller system 1 formed in accordance with one exemplary embodiment of the present invention operably intercoupled with other subsystems in an illustrative application. As generally shown, the memory controller system 1 serves to provide control of a memory 5 (formed by one or more memory devices or chips of any suitable type and configuration known in the art) to support processing of a master control operation by a master controller 2. The memory controller system 1 communicates with the master controller 2 through one or more user interface ports 3, and with the memory 5 through a physical interface (PHY) 4 configured with a suitable interface standard known in the art for the memory 5.

The overall system schematically illustrated in FIG. 1 may be implemented in any known form, depending on the particular requirements of the intended application. For example, the overall system may be realized by discretely interconnected subsystems, or in sufficiently integrated in the form of a system-on-chip (SOC) or the like, depending again on the particular requirements of the intended application. As the master controller, user interface port, PHY, and memory subsystems 2, 3, 4, and 5 may be of any suitable type and configuration known in the art, subject to the particular requirements of a given application, no further description thereof is needed for description of features relating to the memory controller system 1, save when describing interaction with a particular PHY 4 or memory 5. Those skilled in the art will recognize that the overall system shown will typically include numerous other subsystems, logic components, driver circuit portions, and the like other than those generally illustrated in FIG. 1 to carry out its particularly intended functions. In the interests of brevity and clarity, those particular functions outside the system and method disclosed herein are not shown, but will be apparent to those skilled in the art in the context of the particular application intended.

Memory controller system 1 generally includes a command control portion 10 coupled to a data control portion 20 and, optionally but preferably, an error control portion 30. In the embodiment shown, the data control portion 20 preferably includes one or more digital circuits which implement the functional logic to carry out a plurality of data access operations on memory 5. These data access operations include read, write, and read-modify-write operations conducted on selectively addressed storage locations defined in the memory 5. The data access operations preferably include control of such additional functions as periodic data refresh (as required by the particular type of memory device(s) 5 employed) and/or others known in the art.

The error control portion 30 is operably coupled to the data control portion 20, and preferably includes one or more digital circuits which implement the functional logic for detecting and correcting error in data segments as stored in memory 5. The error control portion 30 preferably includes execution of ECC processing of predetermined code format, such as SECDED, to detect error in a corrupted data segment read from the memory 5. The error control portion 30 is configured to correct the data segment read from the memory having error that is correctable with the given ECC, and report (for the master control operation) those data segment errors which are detected but are not correctable with the given ECC.

The command control portion 10 is operably coupled to both the data control and error control portions 20, 30. The command control portion 10 is preferably formed by one or more digital circuits which implement the functional logic for generating commands to actuate various data access operations of the data control portion 20.

The operations of the command control, data control, and error control portions 10, 20, 30 are transmitted as signals which are at least partially according to memory protocols. These signals will therefore be understood by specific memory devices or modules for which the protocols were designed to control. Although some signals of the command control, data control, and error control portions 10, 20, 30 do not reach the memory 5, and therefore need not be according to any memory protocol, for simplicity this description will treat all signals as according to the protocol of the coupled memory, save where the distinction is relevant.

Figure 2A:
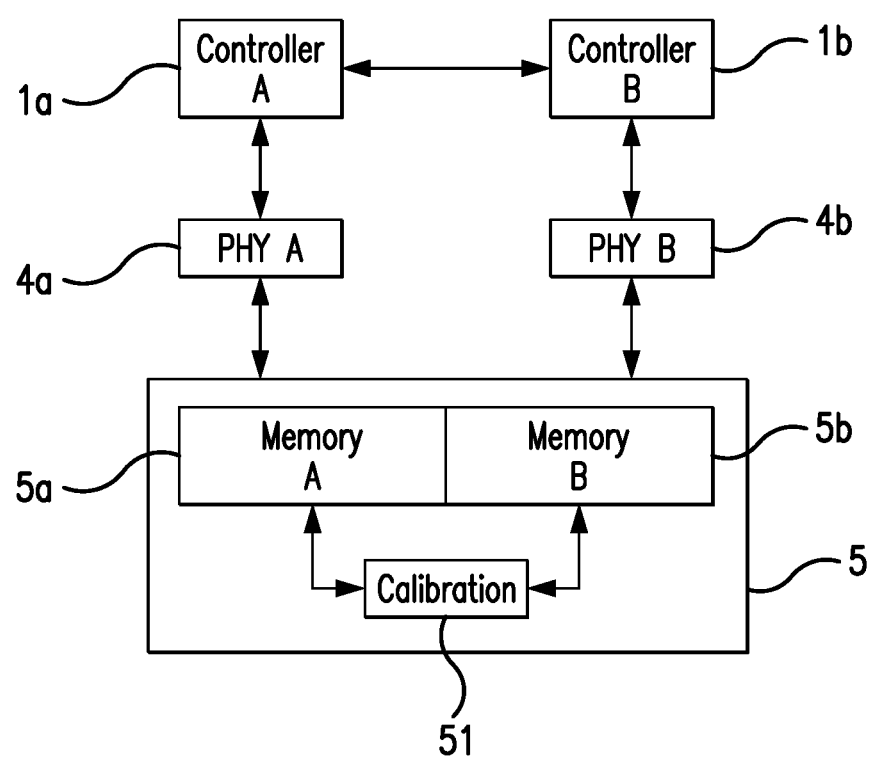
FIG. 2A is a schematic diagram illustrating certain portions of a variable dual-controller memory controller system operably intercoupled to provide control of a coupled memory, in accordance with an exemplary embodiment of the present invention.

For illustrative simplicity, FIG. 1 depicts a single memory controller system 1 coupled through a single PHY 4 to a single memory 5. In practice, a memory device may include multiple memory modules. It may in these circumstances be preferable to supply separate physical interfaces for each module, and even separate memory controllers. FIG. 2A depicts such an arrangement with two modules, according to an example embodiment of the system. For simplicity, two memory modules will be assumed through the remainder of the description, but those of skill in the art will recognize that most of the principles described can be expanded to any number of modules.

As depicted in FIG. 2A, first and second memory controllers 1a, 1b are coupled to first and second physical interfaces (PHYs) 4a, 4b, which are coupled to first and second memory modules 5a, 5b of memory device 5. In this manner, the first memory controller 1a specifically controls the first memory module 5a, using the command control, data control, and error control portions 10, 20, 30 as described for FIG. 1, and the second memory controller 1b likewise specifically controls the second memory module 5b. In an undepicted embodiment, first and second memory modules 5a, 5b are complete and independent memory devices; in another undepicted embodiment, the PHYs 4a and 4b are both coupled to a single memory module, which is virtually divided and treated as two modules.

Figure 2B:
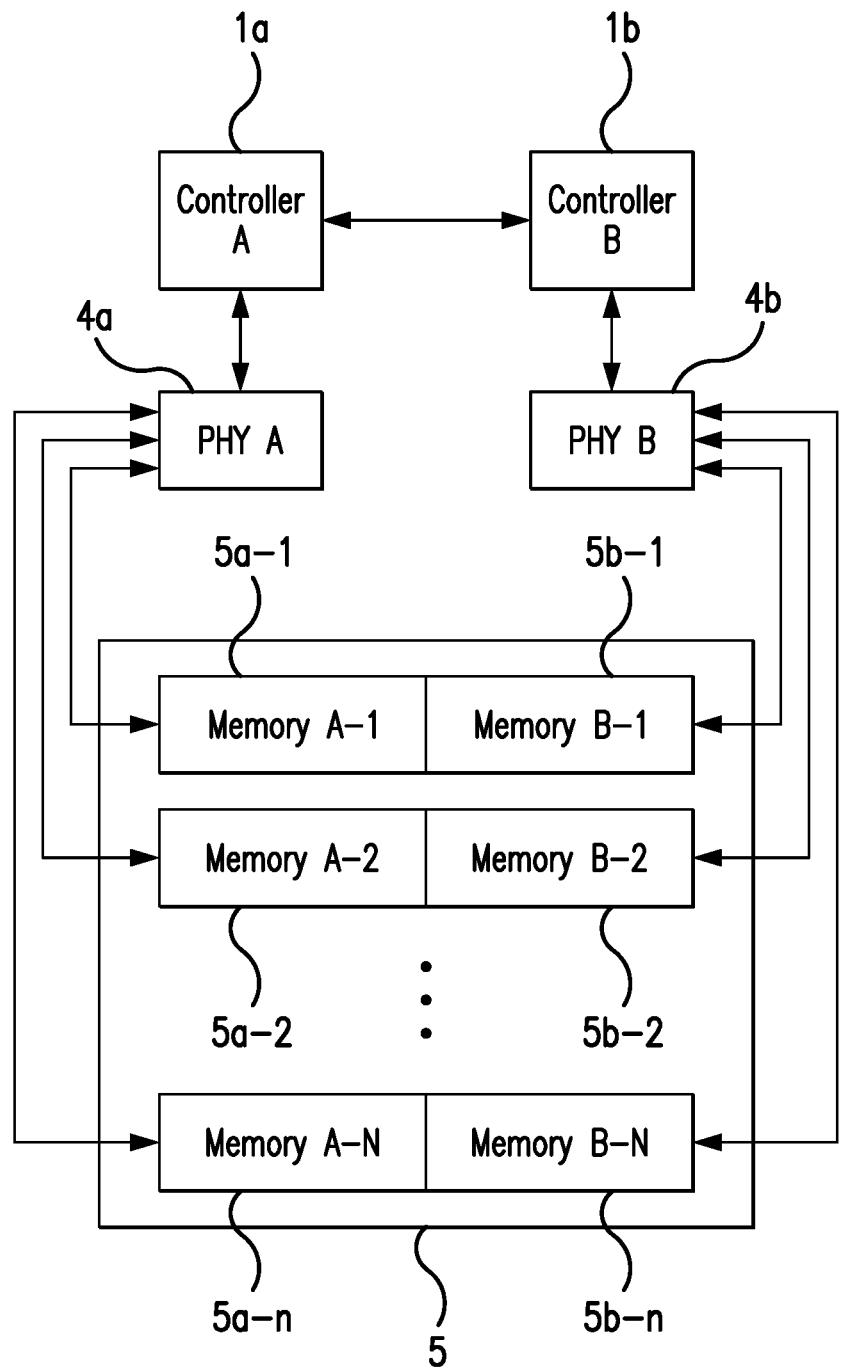
FIG. 2B is a schematic diagram illustrating certain portions of a variable dual-controller memory controller system operably intercoupled to provide control of another coupled memory, in accordance with another exemplary embodiment of the present invention.

The physical interfaces may also each interact with a plurality of memory modules. This variation is depicted in FIG. 2B, wherein the first PHY 4a interfaces with a plurality of first memory modules 5a-1 through 5a-n, and the second PHY 4b interfaces with a plurality of second memory modules 5b-1 through 5b-n. In most such embodiments, the first controller 1a selects one of the plurality of first memory modules 5a-1 through 5a-n to interface with by means of a chip select mechanism, which is known in the art; likewise, the second controller 1b selects one of the plurality of second memory modules 5b-1 through 5b-n.

For convenience, it will be assumed hereinafter that each PHY interacts with only one memory module, as depicted in FIG. 2A, but those of skill in the art will be able to apply the principles disclosed herein to the embodiment of FIG. 2B.

In at least some embodiments, the memory controllers 1a, 1b require coordination of certain operations which are managed through a communication channel between the two. The signals passing through this channel will be described further herein. However, even in these embodiments, in most circumstances the memory controllers 1a, 1b may operate independent of each other in controlling their respective modules, with neither controller being a "master" controller in most or all circumstances.

One advantage of this approach is that both or all modules may, in most or all circumstances, be accessed simultaneously by their respective controllers for faster processing, without need in most circumstances for either controller to control the other.

Another advantage is that each controller may be configured to operate under different memory protocols or specifications, allowing for different types of modules or devices to couple to the same system. This advantage may be furthered in another example embodiment, which is depicted in FIG. 2C.

Figure 2C:
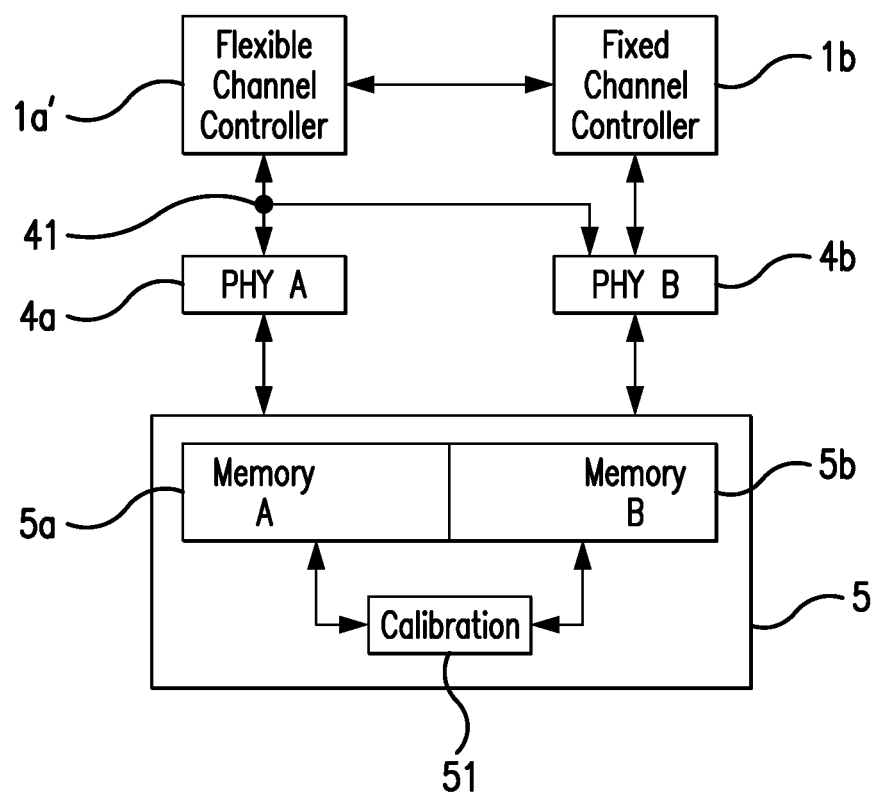
FIG. 2C is a schematic diagram illustrating certain portions of a variable dual-controller memory controller system operably intercoupled to provide control of a coupled memory, in accordance with another exemplary embodiment of the present invention.

The example embodiment depicted in FIG. 2C is similar to the example embodiment depicted in FIG. 2A. However, the first memory controller is a flexible channel memory controller 1a', while the second memory controller is an auxiliary or fixed channel memory controller 1b. Additionally, both memory controllers may be selectively reprogrammed or actuated to operate in various operation modes or control modes. Under a multi-channel control mode, the flexible channel memory controller 1a' is actuated to control both memory modules 5a, 5b, each through their respective physical interfaces 4a, 4b, while the auxiliary or fixed channel memory controller 1b enters an inactive state. Under a single-channel control mode, the flexible channel memory controller 1a' is programmed to control the first memory module 5a through the first PHY 4a, while the auxiliary or fixed channel memory controller 1b is programmed to control the second memory modules 5b through the second PHY 4b.

For convenience of depiction, the connection between flexible channel memory controller 1a' and the PHYs 4a, 4b is depicted to split at intersection 41. It will be recognized that the intersection 41 may instead be within the first PHY 4a, or in an undepicted third PHY between the flexible channel memory controller 1a' and the first and second PHYs 4a and 4b.

Although only one of each category of control mode will be assumed hereinafter for convenience, it is noted that, in some embodiments, there may be more than one control mode that can be termed a multi-channel control mode or a single-channel control mode. In one such example, in a first multi-channel control mode, the flexible channel memory controller 1a' controls each module as a separate device or separate memory chip; in a second multi-channel control mode, the flexible channel memory controller 1a' treats two (or more) modules as a single device or memory chip with a single, shared addressing and shared commands.

One advantage of this approach is that the system may select between the single-channel control mode, where the advantages of the example embodiment depicted in FIG. 2A are made available, and the multi-channel control mode, where the flexible channel memory controller 1a' controls both modules in a simplified fashion, with no need for any coordination between the controllers. The mode may be selected and changed long after manufacture according to the needs of the consumer.

Another advantage of this approach is greater protocol flexibility. Memory controllers which can be configured after manufacture to operate under any of a plurality of memory protocols—for example, that can use both DDR3 and DDR4, or both LPDDR3 and LPDDR4—are known in the art, but are more complex and more expensive to produce than memory controllers which operate under only one protocol. In the example embodiments depicted in FIGS. 2A and 2B, to have the flexibility of choice between protocols for all memory modules, both the memory controllers 1a, 1b would need to be multi-protocol controllers. However, in the example embodiment depicted in FIG. 2C, the fixed channel memory controller 1b may be a single-protocol controller operating under a first protocol, while the flexible channel memory controller 1a' may be a multi-protocol controller operating under either a first protocol or a second protocol. Using this arrangement, if memory modules 5a, 5b use the first protocol, the system may operate under either single-channel control mode or multi-channel control mode. If memory modules 5a, 5b use the second protocol, the fixed channel memory controller 1b cannot control the second memory module 5b, but the flexible channel memory controller 1a' may control both memory modules 5a, 5b in multi-channel control mode.

The system and the controllers within therefore preferably switch between control modes responsive to the coupling of a new memory module or modules, and more specifically to the protocols of the module or modules. The master control 2 or other element of the system may detect these protocols and provide a predetermined command which triggers the selection or re-selection of the control modes, and thereby the appropriate actuation of the memory controllers. Alternatively, the memory device 5 itself may send the predetermined command upon coupling. In still other embodiments, the predetermined command may be provided by a user through the user interface ports 3, either responsive to the memory coupling or for other reasons.

In a particular example, it is noted that LPDDR3 may operate through either a 16 bit PHY or a 32 bit PHY, while LPDDR4 is designed to operate through pairs of 16 bits PHYs to pairs of memory modules. The example embodiment depicted in FIG. 2C is therefore particularly optimal for controlling both LPDDR3 and LPDDR4 memory devices. In a particular embodiment capable of managing both LPDDR3 and LPDDR4 memory devices, flexible channel memory controller 1a' is a multi-protocol controller configurable to use both LPDDR3 and LPDDR4 protocols, while fixed channel memory controller 1b is a single-protocol controller using only LPDDR3. Additionally, PHYs 4a and 4b are both 16-bit PHYs.

If the coupled memory modules 5a and 5b are LPDDR3 memory modules, then in single-channel control mode, the flexible channel memory controller 1a' operates in 16-bit LPDDR3 to control the first memory module 5a through first PHY 4a, and the fixed channel memory controller 1b operates in 16-bit LPDDR3 to control the second memory module 5b through second PHY 4b. In multi-channel control mode, the flexible channel memory controller 1a' operates in 32-bit LPDDR3, which divides into 16 bits and 16 bits at intersection 41 to control the first memory module 5a through first PHY 4a and the second memory module 5b through second PHY 4b; that is, the command bandwidth of the flexible channel memory controller 1a' is evenly divided between the first PHY 4a and second PHY 4b in multi-channel control mode.

If the coupled memory modules 5a and 5b are LPDDR4 memory modules, then in multi-channel control mode, the flexible channel memory controller 1a' operates in LPDDR4, which divides into 16 bits and 16 bits at intersection 41 to control the first memory module 5a through first PHY 4a and the second memory module 5b through second PHY 4b. Single-channel control mode is not possible in this embodiment, as fixed channel memory controller 1b cannot operate in the LPDDR4 protocol, but because LPDDR4 is designed for controlling modules in pairs, a single controller for both modules is in any case preferable.

Those of skill in the art will be able to apply the same principles to other protocols of similar relationship.

In yet another embodiment, which is undepicted, both the first and second memory controllers are flexible channel memory controllers and are coupled to both PHYs. Each memory controller operates exclusively under a particular memory protocol which differs from the protocol of the other controller. The memory modules coupled to the PHYs may therefore each be of either protocol, and each is controlled by the controller operating under that protocol.

Thus, in the above embodiments, the memory controllers operate cooperatively to control the memory modules, either by each controlling their respective modules, or by one controller entering an inactive state to allow the other controller to control both modules.

In the embodiment depicted in FIGS. 2A and 2B, and in the embodiment depicted in FIG. 2C operating in single-channel control mode, both memory controllers 1a (1a'), 1b may control their respective memory modules largely independent of the other. That is, neither memory controller is dominant over the other. However, certain commands invoke resources in the memory device 5 which are shared between both memory modules 5a, 5b, and which both memory controllers 1a (1a') and 1b cannot invoke simultaneously without errors. A mechanism for preventing simultaneous use of these shared resources is therefore preferable.

For brevity, only one specific example of such a shared resource will be detailed herein, but those of skill in the art will be able to apply the same principles to any other shared resources of similar nature in the memory device 5. Also for brevity, only the embodiment depicted in FIG. 2A will be considered hereinafter, but it will be recognized that the same principles are applicable to the embodiment depicted in FIG. 2B or FIG. 2C.

As depicted in FIG. 2A, the coupled memory device 5 includes a calibration unit 51. (For convenience of depiction, the calibration unit 51 is omitted from FIG. 2B, but may be assumed to be present in at least some embodiments.) When a memory controller sends instructions to a memory module to perform a calibration, the memory module in turn activates the calibration unit 51. In the example embodiment depicted in FIG. 2A, either memory controller 1a, 1b may instruct its respective memory module 5a, 5b to perform calibration and thereby activate the calibration unit 51.

This calibration unit 51 may specifically be, for instance, a data pin impedance (commonly, "ZQ") calibration unit, which determines impedance due to environmental conditions; this impedance computation is then used to calibrate on-die termination of the data bus for the memory device or for specific modules therein. In a common implementation, a ZQ calibration unit employs specific programmable registers in both memory modules 5a, 5b to make this determination, even if only one memory module is in need of calibration. It is therefore important that these programmable registers, which will be termed restricted programmable registers hereinafter, not be changed in either module by other operations for the duration of calibration. When a single memory controller controls both memory modules and the calibration unit 51, this is trivial to accomplish. However, when two memory controllers 1a and 1b are operating independently, with both able to invoke the calibration unit 51 through their respective modules, the first controller 1a might reprogram a restricted programmable register in the first memory module 5a while the second memory module 5b is performing ZQ calibration, resulting in a calibration error.

Similar issues may arise with other shared resources, whether employed for calibration or other purposes, and the principles described below may be applied to use of those resources as well.

To protect against such issues, the memory controllers are preferably coupled together, as depicted in the embodiments of FIGS. 2A-2C, to send alert, request, and acknowledgment signals to each other.

Figure 3A:
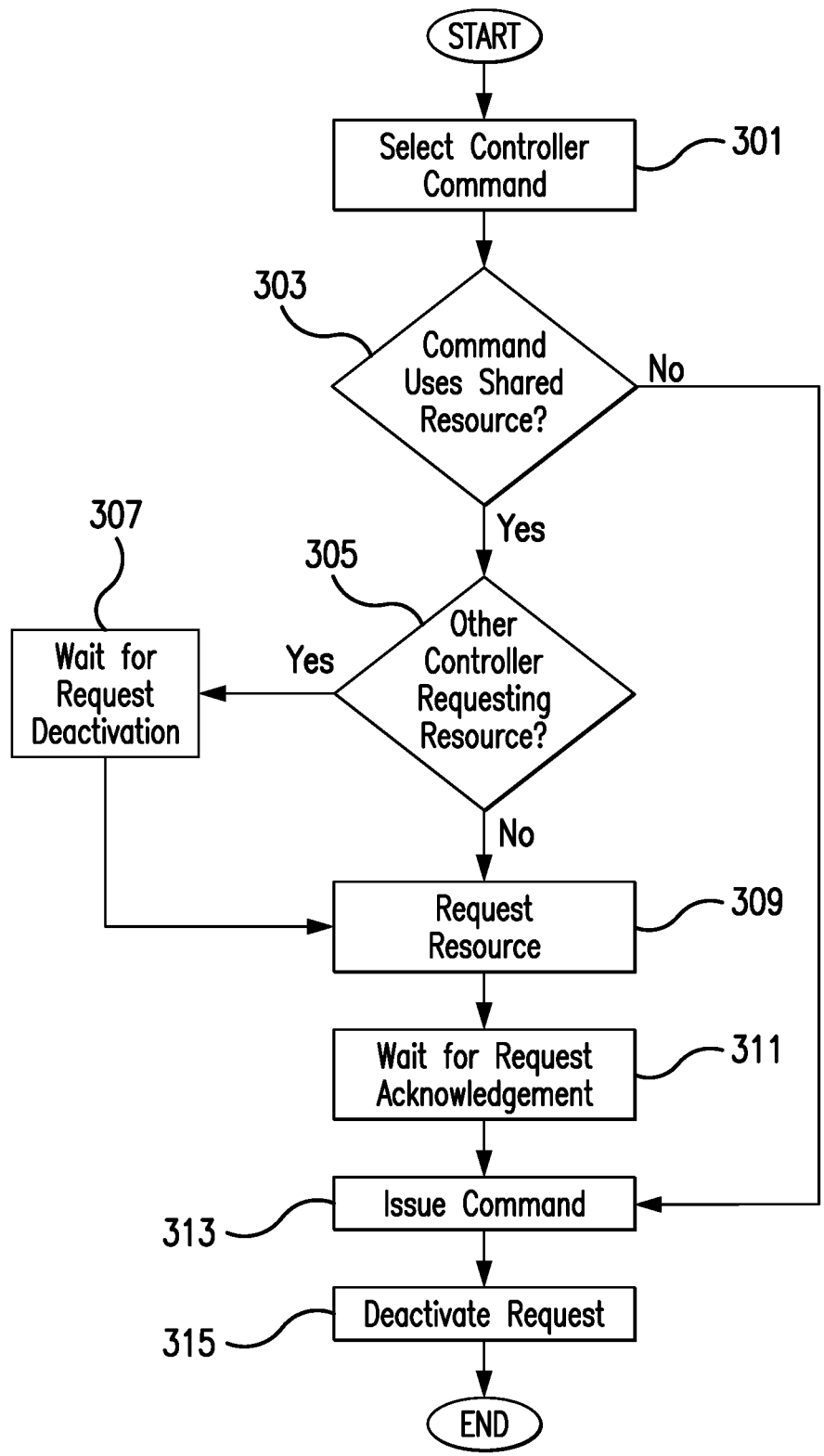
FIG. 3A is a flow diagram illustrating the flow of processes carried out by memory controllers illustrated in FIGS. 2A-2C, in a sample application.

FIG. 3A is a flowchart illustrating the flow of logic carried out by memory controllers illustrated in FIGS. 2A-2C, in a sample application, to prevent interfering use of shared resources, such as restricted programmable registers or other restricted locations on the memory device. It is noted that this process is unnecessary in multi-channel control mode when only one of the memory controllers is active. It is also noted that the process is preferably the same for both memory controllers; for brevity, the first memory controller will be assumed.

At 301, the first memory controller selects a controller command to execute in the first memory module. At 303, it is determined whether the controller command will use a restricted location or other shared resource, such as a restricted programmable register, which cannot be used by both controllers at once. A list of such resources, or of the controller commands which invoke them (which may be termed restricted commands), may be predetermined, stored within the memory controller or elsewhere, and referenced for this operation. If no shared resource will be used by the command, the first controller may immediately proceed to 313, where the command is issued to the first memory module; the process then ends.

If the controller command will use a shared resource, it is determined at 305 if the second controller is transmitting a suitable active signal indicating a request for the resource. If so, the resource is in use and "locked down" by the second controller. Therefore, the first controller waits at 307 for the second controller's request signal to deactivate, indicating it is finished with the resource, before proceeding to 309. If there is no active request or lockdown signal for the location, the first controller may proceed to 309 immediately.

At 309, the first controller requests the protected location or other shared resource. That is, it sends a suitable request signal to the second controller. This may be a single bit signal along a signal channel exclusive for that resource, or it may be a multi-bit signal which identifies the resource. Preferably, this signal takes the same form as the signal transmitted from the second controller at 305 and 307. The second controller will therefore process the request signal in the same manner as the first controller and, if it later selects a command which will invoke the same resource, it will first wait for the first controller's request to deactivate, as the first controller did with the second controller's request at 307.

Although no request signal from the second controller was active as of 309, it is possible that the second controller could be on the verge of sending such a signal. That is, the two controllers could be requesting the same resource at the same time. Therefore, at 311, the first controller waits for the second controller to respond to the request with a suitable acknowledgment signal.

The second controller will send the acknowledgment signal if it receives the request signal and is not sending or about to send a request signal for the same resource. If the second controller is sending or about to send a request signal for the same resource, there may be several ways by which the two controllers may cooperatively determine which will use the resource first, the simplest of which is "the first controller always goes first," although others may be easily imagined by those of skill in the art. In accordance with that determination, the second controller will either send the acknowledgment signal immediately, or wait for the first controller to send the acknowledgment signal responsive to its own request signal, complete its use of the resource, and then send the acknowledgment signal.

Once the first controller receives the second controller's acknowledgment signal at 311, it issues the command to the first memory module at 313. At 315, the first controller deactivates the request signal, signaling to the second controller that the resource is available again. (It is noted that the operation 315 of deactivating the request signal always follows the command issuance 313, but is irrelevant if the command did not use a shared resource, as there was no active request.) The process then ends.

In an undepicted embodiment, operations 305 and 307 are omitted. Instead, the first controller sends the request signal at 309 regardless of whether the second controller is already sending its own request signal (i.e. already using the resource). The second controller does not respond to the request signal until it has finished using the resource, and only then sends a suitable acknowledgment signal, which allows the first controller to proceed from 311 to 313 and use the resource. In such embodiments, the request signal of the first controller may be deactivated once the acknowledgment signal of the second controller is received, as the second controller will not respond to it in any manner other than sending said acknowledgment signal.

Figure 3B:
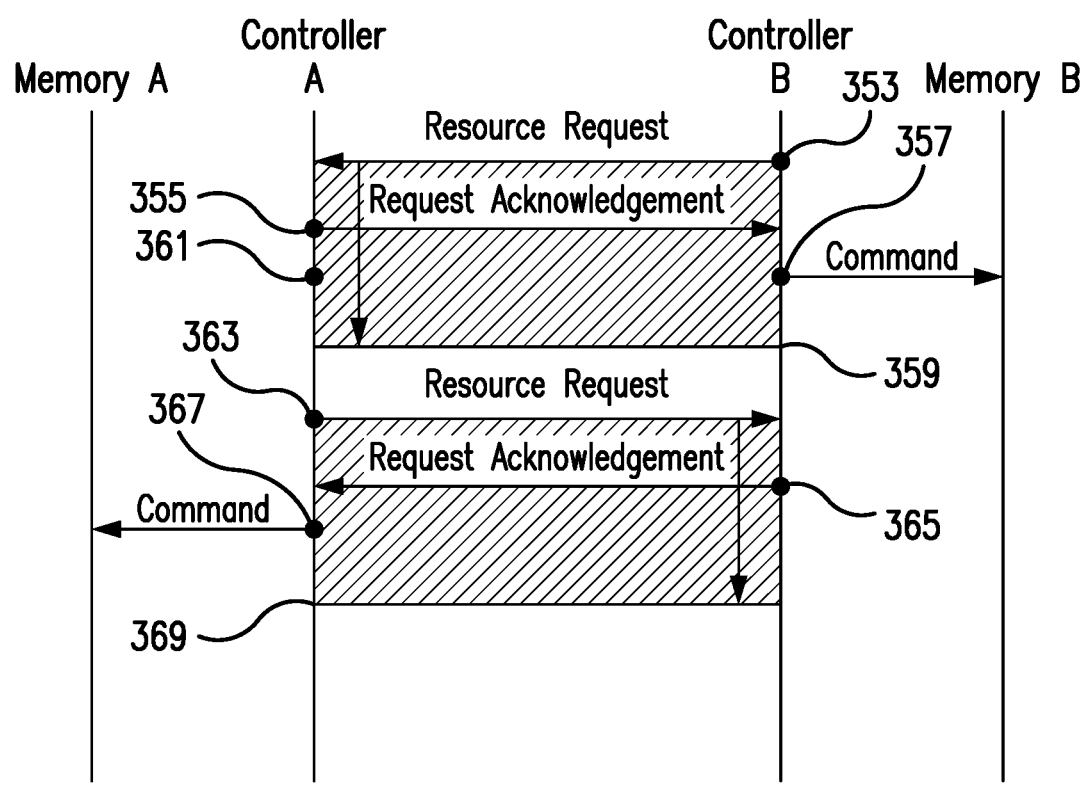
FIG. 3B is a timing diagram illustrating the exchange of signals between portions illustrated in FIGS. 2A-2C, in a sample application.

FIG. 3B depicts a timing diagram for an example exchange of the request and acknowledgment signals described above.

According to the example exchange in FIG. 3B, at time 353, the second controller requests a restricted location or other shared resource (see operation 309 in FIG. 3A), such as a restricted programmable register. At time 355, the first controller acknowledges the request, and the acknowledgment is received by the second controller (operation 311). Therefore, at time 357 the second controller issues the command to the second memory (operation 313). The second controller then deactivates the request at time 359 (operation 315).

At time 361, the first controller is at operation 305 with its own selected command. However, the second controller's request signal is still active at time 361 (see operation 305), and therefore the first controller waits (operation 307) until time 359 when the second controller's request signal deactivates. The first controller may then request the resource at time 363, receive the acknowledgment at 365, issue the command at 367, and deactivate the request at 369.

Figure 4A:
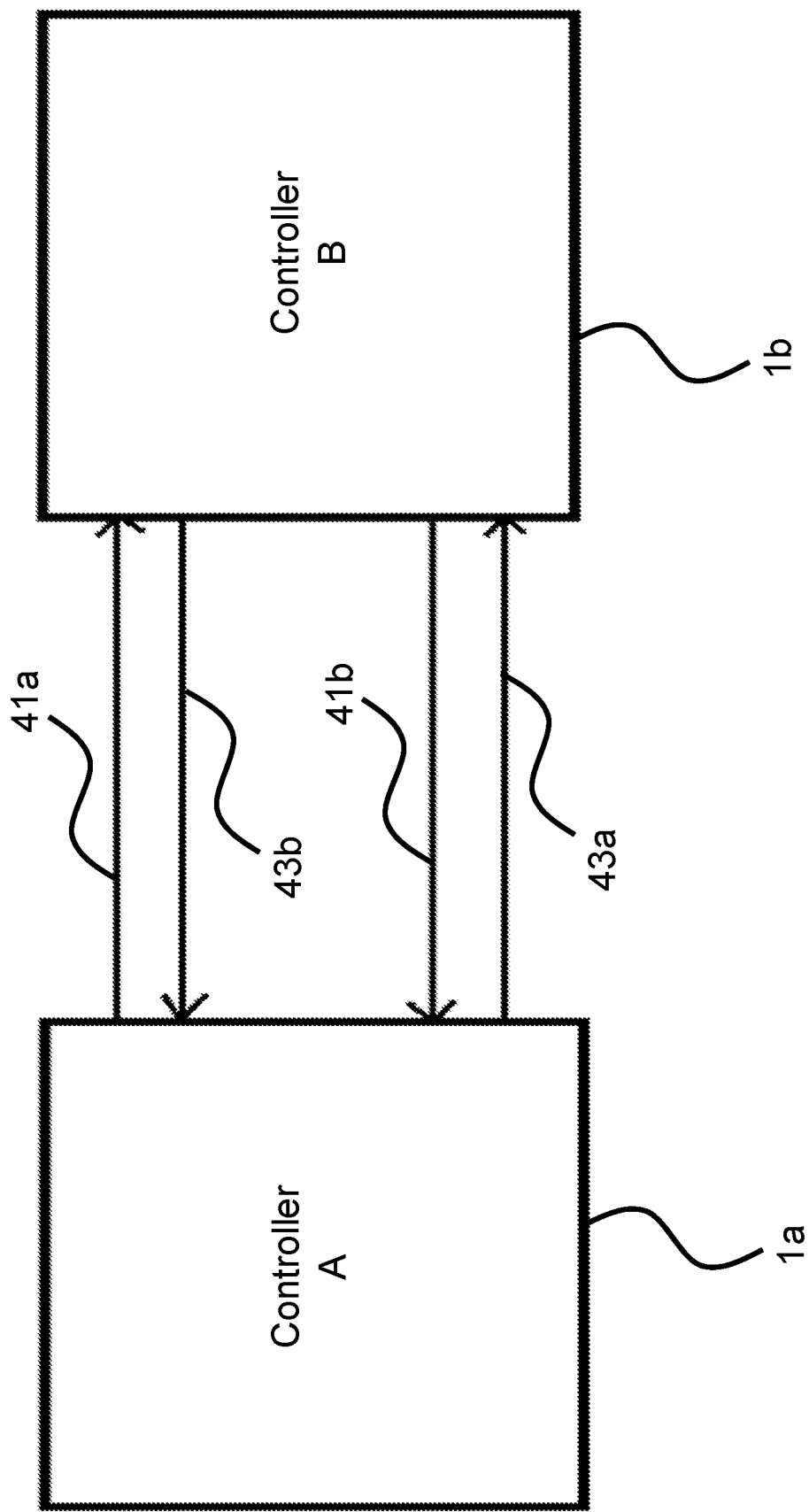
FIG. 4A is a schematic diagram showing one exemplary embodiment of the memory controllers of the system embodiment illustrated in FIGS. 2A-2C, in a sample application.
Figure 4B:
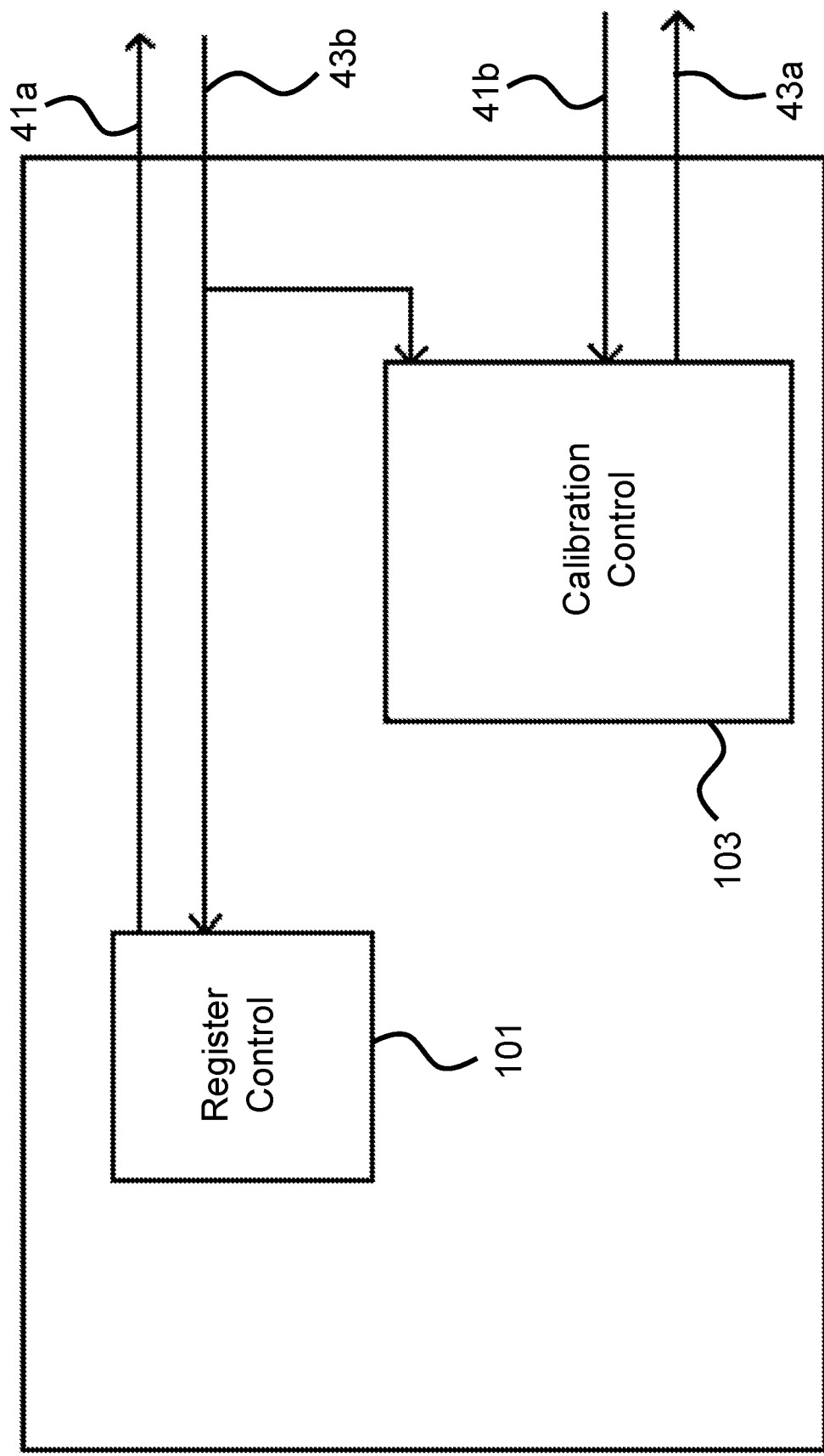
FIG. 4B is a schematic diagram showing one exemplary embodiment of a command control portion of the system embodiment illustrated in FIGS. 2A-2C, illustrating certain operable intercoupling with other portions of the system in a sample application.

A mechanism for the exchange of these request and acknowledgment signals is depicted in FIGS. 4A and 4B, according to an embodiment of the invention. As depicted in FIGS. 4A and 4B, the command control portion 10 of the first memory controller 1a includes a register control unit 101 and a calibration control unit 103. The register control portion 101 controls operations relating to the programmable registers in the first memory module 5a, and the calibration control portion 103 controls operations relating to the calibration unit 51. Both portions may additionally interact with other control portions such as a task arbiter or command multiplexor, which are undepicted. In the interests of brevity and clarity, those particular portions outside the system and method disclosed herein are not shown, but will be apparent to those skilled in the art in the context of the particular application intended. In other embodiments, these units 101, 103 may be in another portion of the first memory controller 1a.

When the register control portion 101 recognizes that a pending command will access a restricted programmable register, or other protected location, it transmits the resource request as a single bit signal along a first request channel 41a. This request is received by the second controller 1b, which responds by transmitting the request acknowledgment as a single bit signal along a second acknowledgment channel 43b. The request acknowledgment is received by both the register control portion 101, which is now permitted to access the restricted programmable registers, and the calibration control 103, which is now permitted to activate a calibration process. Both permissions remain in effect until the second controller 1b stops transmitting the request acknowledgment, which it preferably does only after the register control portion 101 stops transmitting the resource request.

When the calibration control receives a resource request as a single bit signal along a second request channel 41b, it confirms that it has not activated and is not about to activate a calibration process, and then transmits a request acknowledgment as a single bit signal along a first acknowledgment channel 43a.

Preferably, a register control unit 101 and a calibration control unit 103 are also included in the second memory controller 1b, and respond in a mirrored fashion to the same conditions and signals.

It is noted that this approach efficiently uses the same signal and same signal channel both to request use of the resource by seeking a corresponding acknowledgment from the controller, and to lock down use of the resource from the other controller for the duration of use.

This approach avoids any designations of "master" or "slave" controllers, but at the cost of a nominal delay in use of shared resources by either controller, as each must wait for the acknowledgment signal of the other controller before proceeding. There is also an additional delay from any necessary negotiation of priority when two request signals are sent simultaneously.

Therefore, in an alternative embodiment, one of the controllers may be designated a master controller specifically for the purposes of a given shared resource, and the other controller designated a slave controller. This designation may be temporary or permanent, and may be for a specific shared resource or for all shared resources. Preferably, this designation only affects controller activity that related to the relevant shared resources. That is, most controller operations may continue independently without use of a master-slave paradigm.

Returning to FIG. 3A, in this alternative embodiment, once it is determined at 305 that the resource is not being used by another controller, the designated master controller (herein assumed to be the first controller 1a for convenience) does not wait for the request acknowledgment at 311, but immediately proceeds to 313 to issue the command after sending the request 309. In this approach, the "request" signal of the master controller 1a may be more accurately termed simply a "reservation" or "lockdown" signal, as the controller does not wait for permission before proceeding; however, the signals may use the same channel 41a. If the designation as master controller is permanent, the acknowledgment channel 43b from the slave controller to the master controller may be omitted entirely.

The designated slave controller (herein assumed to be the second controller 1b for convenience) waits for the request acknowledgment at 311 as before. The slave controller 1b therefore serves to prevent simultaneous requests for the resource from executing, removing the need of the master controller 1a to do the same. Additionally, under this approach, any simultaneous requests are naturally and immediately resolved in favor of the designated master controller 1a.

The designated master controller 1a must confirm at 305 that the resource is not already in use by the second controller 1b, as it will not receive a later confirmation by way of an acknowledgment at 311. The designated slave controller 1b may omit operations 305 and 307, as described above. If the designated slave controller omits operations 305 and 307, and the designation as slave controller is permanent, request channel 41a from the master controller to the slave controller may be omitted.

Figure 4C:
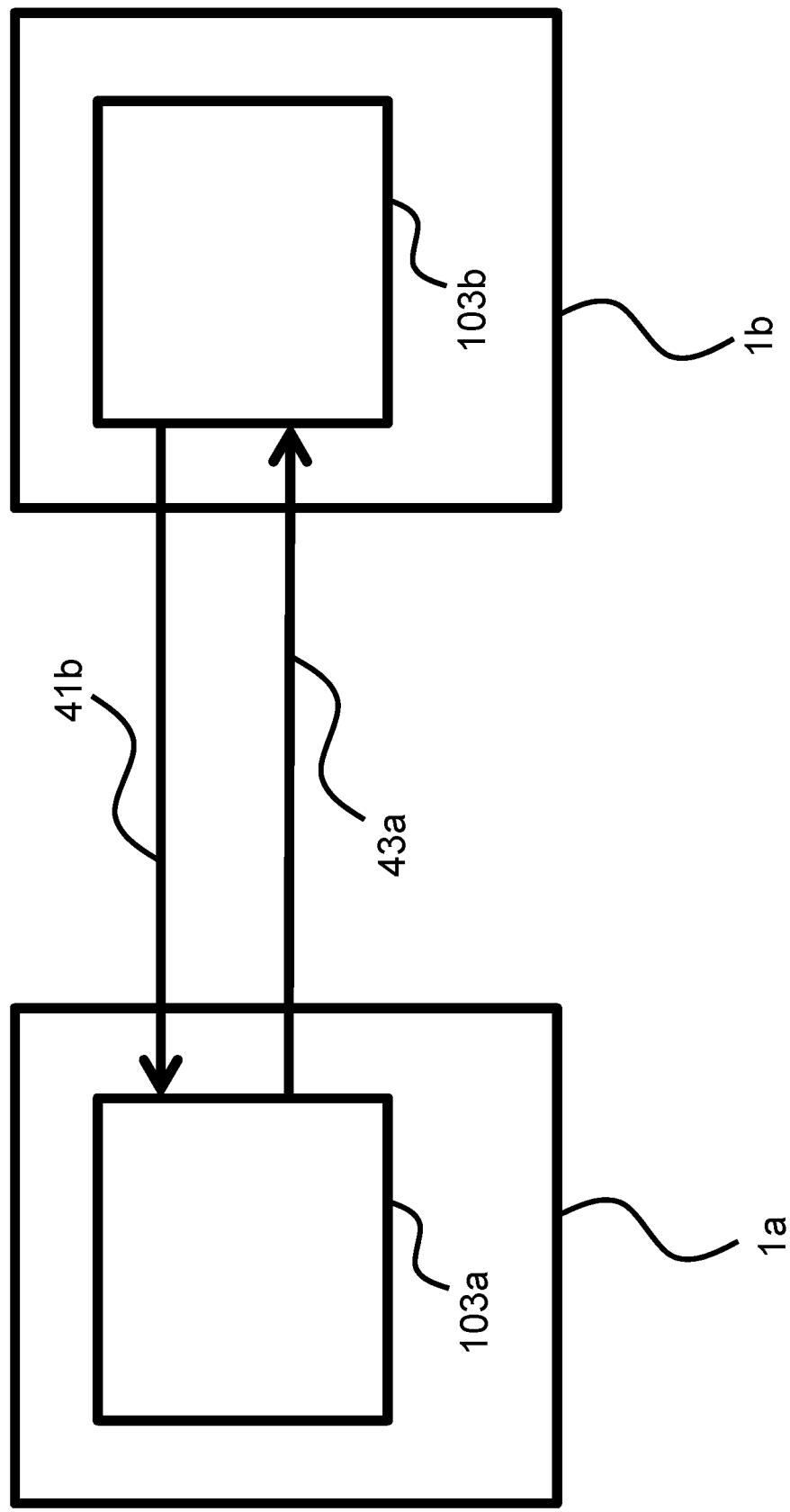
FIG. 4C is a schematic diagram showing another exemplary embodiment of the memory controllers of the system embodiment illustrated in FIGS. 2A-2C, in a sample application.

This alternative embodiment with a limited-focus master-slave designation may, therefore, operate on only two channels, request channel 41b from the slave controller 1b to the master controller 1a and acknowledgment channel 43a from the master controller 1a to the slave controller 1b, as depicted in FIG. 4C. (For convenience of depiction, in FIG. 4C, the register control 101 is combined into the calibration controls 103a, 103b in both controllers, but may be assumed to be present as a separate control portion in at least some embodiments.) Additionally, the master controller 1a does not wait for an acknowledgment signal from the slave controller at 311, and the slave controller 1b does not check for a request signal from the master controller at 305 or wait for its deactivation at 307.

In a variant on this alternative embodiment, instead of sending an acknowledgment signal only after receiving a request signal, the designated master controller 1a keeps an acknowledgment signal active whenever it is not using the shared resource, and deactivates said signal when it intends to use the resource. Deactivation of the acknowledgment signal therefore is treated as equivalent to activation of the request signal of other embodiments. Therefore, the designated slave controller 1b only uses the shared resource (or activates its own request signal) when the acknowledgment signal of the designated master controller 1a is active.

It is again noted that the principles described above may be applied to access to other shared locations and resources in the memory device 5 which are used, directly or indirectly, by both memory modules 5a, 5b and therefore controllable, directly or indirectly, by both memory controllers 1a, 1b. Preferably, a separate set of request and acknowledgment channels are provided for each said resource; those of skill in the art will be able to determine the appropriate control portions of the memory controllers to link to each channel, according to the shared resource being managed.

Any instruction or command that uses such a shared resource may be termed a restricted memory control command. Any signal that alerts the opposing controller that a shared resource is already in use (and therefore unavailable) may be termed a restricted command lockdown signal. Any signal that alerts the opposing controller of a pending restricted memory control command may be termed a restricted command request signal, and any signal that confirms to the opposing controller, responsive to a restricted command request signal, that the shared resource is not in use may be termed a restricted command acknowledgment signal. It is noted that, according to the embodiments described above, the resource request serves both as a restricted command lockdown signal and a restricted command request signal; in other embodiments, two separate signals may be used.

It is also noted that other memory operations or commands may be desirable for both controllers to run simultaneously, rather than asynchronously as described above. For example, memory controllers 1a and 1b may conduct regular leveling operations, to maintain synchronization of signals. As a side effect of the leveling operations, the stored content in the memory module undergoing leveling is inaccessible for the duration. In a single-controller arrangement (or in single-controller mode as described above), all modules are preferably leveled at the same time; this accomplishes a complete leveling as quickly as possible, and removes the need to determine whether any particular module is inaccessible due to leveling, as all are either accessible or inaccessible. It may be preferable, for the same reasons, to conduct leveling in both memory modules 5a, 5b at the same time even in a multi-controller mode or configuration. Therefore, a signal channel between the controllers 1a, 1b, which may be a single-bit channel, informs the second controller 1b when the first controller 1a is conducting leveling in the first memory module 5a, so that the second controller 1b may do likewise in the second memory module 5b at the same time; and vice versa. An acknowledgment signal may be provided in response, in some embodiments. Those of skill in the art will be able to apply the same principles to other operations which are preferably conducted on all memory modules simultaneously.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method steps may be substituted for those specifically shown and described, and certain features may be used independently of other features, and all or some of the above embodiments may be selectively combined with each other, and in certain cases, particular locations of elements or sequence of method steps may be reversed or interposed, all without departing from the spirit or scope of the disclosed system and method as defined in the appended claims. The scope should therefore be determined with reference to the description above and the appended claims, along with their full range of equivalents.

What is claimed is:

1. A variable channel multi-controller memory system comprising:
    a flexible channel memory controller;
    an auxiliary memory controller coupled to the flexible channel memory controller via a dedicated electrically conductive communication channel between the flexible channel memory controller and the auxiliary memory controller;
    a first physical interface for coupling to a first memory module, the first physical interface coupled to the flexible channel memory controller; and
    a second physical interface for coupling to a second memory module, the second physical interface coupled to both the flexible channel and auxiliary memory controllers;
    wherein the flexible channel and auxiliary memory controllers are configured to be variably actuated according to a plurality of control modes for controlling the first and second memory modules, the flexible channel and auxiliary memory controllers in a single-channel control mode being configured for respective independent control of the first and second memory modules through the first and second physical interfaces, the flexible channel memory controller in a multi-channel control mode being configured for combined control of both the first and second memory modules through the first and second physical interfaces respectively,
    wherein the first and second memory modules are coupled to a shared memory resource that is distinct from the first and second memory modules, the shared memory resource operable to access a restricted programmable register in at least one of the first and second memory modules in response to a restricted memory control command from either the flexible channel memory controller or the auxiliary memory controller,
    wherein, in the single-channel control mode, one of the auxiliary and flexible channel memory controllers is configured to function as a master controller and the other of the auxiliary and flexible channel memory controllers is configured to function as a slave controller,
    the master controller being configured to provide, via the communication channel, a request signal that functions as a lockdown signal to the slave controller and to execute the restricted memory control command upon providing the lockdown signal without first waiting for receipt of a request acknowledgement signal from the slave controller, and
    wherein the slave controller is configured to:
        determine that the lockdown signal has or has not been provided from the master controller;
        transmit a resource request to the master controller indicating a request for access to the shared memory resource upon determining that a state of the lockdown signal indicates that the master controller is not restricting access to the shared memory resource; and
        execute the restricted memory control command in response to receipt of a request acknowledgement signal from the master controller provided in response to the resource request transmitted by the slave controller.

2. The variable channel multi-controller memory system of claim 1, wherein the flexible channel memory controller is configured to divide command bandwidth evenly between the first and second physical interfaces while operating in the multi-channel control mode.

3. The variable channel multi-controller memory system of claim 1, wherein the auxiliary memory controller is configured to enter an inactive state in the multi-channel control mode.

4. The variable channel multi-controller memory system of claim 1, wherein the control mode is selected responsive to protocols of the first and second memory modules upon respective coupling of the first and second physical interfaces thereto.

5. The variable channel multi-controller memory system of claim 1, wherein the shared memory resource is a ZQ calibration unit operable to access specific programmable registers in both the first and second memory modules.

6. The variable channel multi-controller memory system of claim 1, wherein the master controller is configured to activate the lockdown signal prior to execution of the restricted memory control command and to deactivate the lockdown signal upon completion of the execution of the restricted memory control command, inhibiting the slave controller from commanding access to the shared memory resource for at least an active period of the lockdown signal.

7. The variable channel multi-controller memory system of claim 1, wherein the master controller is configured to provide the lockdown signal to the slave controller immediately based on the master controller determining that the slave controller is not transmitting the resource request to the master controller, or after waiting for the resource request to deactivate based on the master controller determining that the slave controller is transmitting the resource request.

8. A method of variably controlling a memory device using a plurality of memory controllers, the method comprising:
   establishing a flexible channel memory controller and an auxiliary memory controller coupled to each other via a dedicated electrically conductive communication channel between the flexible channel memory controller and the auxiliary memory controller;
   establishing a first physical interface coupled to the flexible channel memory controller;
   establishing a second physical interface coupled to the auxiliary memory controller;
   respectively coupling the first and second physical interfaces to first and second memory modules of the memory device, wherein the first and second memory modules are coupled to a shared memory resource that is distinct from the first and second memory modules, the shared memory resource operable to access a restricted programmable register in at least one of the first and second memory modules in response to a restricted memory control command from either the flexible channel memory controller or the auxiliary memory controller;
   selecting a control mode from a plurality of control modes that include
      a single-channel control mode wherein the flexible channel and auxiliary memory controllers are configured for respective independent control of the first and second memory modules through the first and second physical interfaces, and
      a multi-channel control mode wherein the flexible channel memory controller is configured for combined control of both the first and second memory modules through the first and second physical interfaces respectively;
   variably actuating the flexible channel and auxiliary memory controllers to operate in the selected control mode;
   in the single-channel control mode, with one of the auxiliary and flexible channel memory controllers functioning as a master controller and the other of the auxiliary and flexible channel memory controllers functioning as a slave controller, providing a request signal that functions as a lockdown signal from the master controller to the slave controller via the communication channel, and executing the restricted memory control command on the master controller upon providing the lockdown signal without first waiting for receipt of a request acknowledgement signal from the slave controller;
   the slave controller transmitting to the master controller a resource request for access to the shared memory resource upon the slave controller determining that a state of the lockdown signal indicates that the master controller is not restricting access to the shared memory resource; and
   the slave controller executing the restricted memory control command in response to receipt of a request acknowledgement signal from the master controller provided in response to the resource request transmitted by the slave controller.

9. The method of claim 8, wherein the control mode is selected responsive to protocols of the first and second memory modules upon respective coupling of the first and second physical interfaces thereto.

10. The method of claim 8, wherein the shared memory resource is a ZQ calibration unit that accesses specific programmable registers in both the first and second memory modules.

11. The method of claim 8, further comprising the flexible channel memory controller dividing command bandwidth evenly between the first and second physical interfaces while operating in a multi-channel control mode.

12. The method of claim 8, further comprising the auxiliary memory controller entering an inactive state in the multi-channel control mode.

13. The method of claim 8, wherein the master controller provides the lockdown signal to the slave controller immediately based on the master controller determining that the slave controller is not transmitting the resource request to the master controller, or after waiting for the resource request to deactivate based on the master controller determining that the slave controller is transmitting the resource request.

14. A cooperative multi-controller memory system comprising:
   a first memory controller;
   a second memory controller coupled to the first memory controller via a dedicated electrically conductive communication channel between the first memory controller and the second memory controller;
   a first physical interface for coupling to a first memory module, the first physical interface coupled to the first memory controller; and
   a second physical interface for coupling to a second memory module, the second physical interface coupled to at least the second memory controller;
   wherein the first and second memory modules are coupled to a shared memory resource that is distinct from the first and second memory modules, the shared memory resource operable to access a restricted programmable register in at least one of the first and second memory modules in response to a restricted memory control command from either the first memory controller or the second memory controller;
   wherein the first memory controller is configured to provide, via the communication channel, a request signal that functions as a lockdown signal to the second memory controller and to execute the restricted memory control command upon providing the request signal that functions as the lockdown signal without first waiting for receipt of a request acknowledgement signal from the second memory controller, and
   wherein the second memory controller is configured to:
      determine that the lockdown signal has or has not been provided from the first memory controller;
      transmit a resource request to the first memory controller indicating a request for access to the shared memory resource upon determining that the state of the lockdown signal indicates that the first memory controller is not restricting access to the shared memory resource; and execute the restricted memory control command in response to receipt of a request acknowledgement signal from the first memory controller provided in response to the resource request transmitted by the second memory controller.

15. The cooperative multi-controller memory system of claim 14, wherein the first memory controller is configured to activate the lockdown signal prior to execution of the restricted memory control command and to deactivate the lockdown signal upon completion of the execution of the restricted memory control command, inhibiting the second memory controller from commanding access to the shared memory resource for at least an active period of the lockdown signal.

16. The cooperative multi-controller memory system of claim 14, wherein the first memory controller is configured for combined control of both the first and second memory modules through the first and second physical interfaces respectively and the second memory controller is configured to enter an inactive state in a multi-channel control mode of the system.

17. The cooperative multi-controller memory system of claim 16, wherein the first memory controller is configured to divide command bandwidth evenly between the first and second physical interfaces while operating in the multi-channel control mode.

18. The cooperative multi-controller memory system of claim 16, wherein the multi-channel control mode is selected responsive to protocols of the first and second memory modules upon respective coupling of the first and second physical interfaces thereto.

19. The cooperative multi-controller memory system of claim 14, wherein the first memory controller is configured to transmit the lockdown signal to the second memory controller immediately based on the first memory controller determining that the second memory controller is not transmitting the resource request to the first memory controller, or after waiting for the resource request to deactivate based on the first memory controller determining that the second memory controller is transmitting the resource request.

* * * * *